(12) United States Patent
Lee

(10) Patent No.: US 10,664,800 B2
(45) Date of Patent: May 26, 2020

(54) PARCEL DELIVERY SYSTEM AND METHOD

(71) Applicant: Andrew Lee, Old Hickory, TN (US)

(72) Inventor: Andrew Lee, Old Hickory, TN (US)

( * ) Notice: Subject to any disclaimer, the term of this patent is extended or adjusted under 35 U.S.C. 154(b) by 0 days.

(21) Appl. No.: 16/149,840

(22) Filed: Oct. 2, 2018

(65) Prior Publication Data

US 2019/0102728 A1    Apr. 4, 2019

Related U.S. Application Data

(60) Provisional application No. 62/566,827, filed on Oct. 2, 2017.

(51) Int. Cl.
*G06Q 10/08*    (2012.01)

(52) U.S. Cl.
CPC .................................. *G06Q 10/087* (2013.01)

(58) Field of Classification Search
CPC ..................................................... G06Q 10/087
USPC .......... 235/375, 379, 380, 381; 705/341, 339
See application file for complete search history.

(56) References Cited

U.S. PATENT DOCUMENTS

| | | | |
|---|---|---|---|
| 9,858,737 B2 | 1/2018 | Davidsson | |
| 2014/0180955 A1* | 6/2014 | Podgurny | G06Q 10/08 705/335 |
| 2015/0106291 A1* | 4/2015 | Robinson | G06F 21/62 705/339 |
| 2016/0019775 A1* | 1/2016 | Fokkelman | G06Q 10/083 340/539.32 |
| 2016/0210590 A1* | 7/2016 | Sugioka | G06Q 10/08355 |
| 2016/0307380 A1 | 10/2016 | Ho | |
| 2017/0018181 A1* | 1/2017 | Davidsson | G06Q 10/0833 |
| 2017/0076520 A1 | 3/2017 | Ho | |
| 2018/0240067 A1 | 8/2018 | Oz | |
| 2019/0007794 A1* | 1/2019 | Thakur | H04W 4/023 |
| 2019/0311327 A1* | 10/2019 | Habbaba | H04W 4/44 |

FOREIGN PATENT DOCUMENTS

| | | |
|---|---|---|
| DE | 102014004673 A1 | 10/2015 |
| DE | 102014223769 A1 | 5/2016 |
| KR | 102017011518 A | 10/2017 |

OTHER PUBLICATIONS

DHL now delivering to trunks of VW cars, May 9, 2017, DHL 2017 Parcel ecommerce press release.
E-commerce delivery in your car, by Car Drops, Sep. 11, 2012, cardrops.com via web archive.org/web/20120911003815.

* cited by examiner

*Primary Examiner* — Allyson N Trail
(74) *Attorney, Agent, or Firm* — Glen N. Geiser; David E. Roberts; Gutwein Law

(57) ABSTRACT

A parcel delivery system and method for the delivery of a parcel into a vehicle within a parking location. The system and method uses communicative devices coupled to a vehicle and capable of providing a position of the vehicle within the parking location to a controller for the direction of a delivery of a given parcel. The system assigns a given parking location with an address for use by a user to direct a delivery into a vehicle parked within the parking location.

10 Claims, 3 Drawing Sheets

PARCEL DELIVERY SYSTEM AND METHOD

CROSS REFERENCE TO RELATED APPLICATIONS

This application claims priority to U.S. Provisional Patent Application No. 62/566,827 filed 2 Oct. 2017 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

This invention relates generally to an improved system and method for parcel delivery to improve efficiency for carriers and increase convenience for customers. Generally the system and method allows a carrier to deliver a package to a vehicle within a specifically designated parking location.

BACKGROUND

With the advent of the Internet and more specifically the popularity of online shopping, the number of packages/parcels being delivered on any given day is steadily increasing. To meet both the demands and cost targets of these deliveries, parcel delivery providers are continually looking for ways to improve efficiency and their methods of delivery.

Within the prior art improved delivery systems have been provided that generally deliver packages to a kiosk at a common location (U.S. Pat. No. 6,882,269), predict the location for the receipt of a package based upon the location of a user through the receipt of certain transactions conducted by the user (US Pat. Appl. Publ. No. 2015/0046365), and allow the user to select a desired location for a pickup or delivery based upon their current location (US Pat. Appl. Publ. No. 2004/0153370).

Still further, delivery systems have been disclosed that utilize technological improvements for dynamic delivery to an establishment directly to a vehicle based upon the route of an item to be delivered (US Pat. Appl. Publ. Nos. 2016/0314429; 2015/0154559). Further delivery systems allow for delivery to an alternate location through communication with a personal electronic device, such as a mobile phone, utilizing the communication features of the mobile phone to determine the location for delivery (US Pat. Appl. Publ. Nos. 2014/0180959; 2015/0242811). Still other delivery systems utilize a device in communication with various systems of a vehicle to enable access to the vehicle for the delivery of a package (US Pat. Appl. Publ. Nos. 2016/0098876; 2016/0342944; 2016/0342943).

While these methods are helpful and useful for both customers and carriers, there still exists a need to improve the efficiency of deliveries for a carrier and provide improvements in the form of convenience regarding delivery for a customer, wherein a parcel is delivered directly into a vehicle that is parked in a predetermined and specific location for accepting a delivery.

BRIEF SUMMARY OF THE INVENTION

In one aspect, this disclosure is related to a parcel delivery system and method adapted to deliver a parcel to a vehicle within a preselected parking location selected by a user. The parking location corresponding to a parking lot, parking garage, parking ramp, or other similar structure or area designated for the parking of cars.

In another aspect, this disclosure is related to a delivery system and method that allows the delivery of a parcel to a vehicle within a given parking location with the vehicle parked at any position within the parking location. The system and method utilizes an electronic communication device having a unique ID and coupled to the vehicle and vehicle systems to generally communicate with a host computer to direct a parcel delivery to the precise location of the vehicle within the parking location and correspondingly direct the vehicle systems to allow for access to the interior of the vehicle for the receipt of a given parcel. The electronic communication device includes a global positioning system (GPS) receiver, a microprocessor, and a wireless communication transceiver coupled to the GPS receiver and in communication with a location module.

The location module generally allows a user to search and select a designated parking location where the vehicle will be parked and the parcel delivered to. The location module is generally hosted on a server executable by a processor and coupled to a mapping system to provide the user with a listing of parking locations in a designated area that can be selected by the user for the delivery within the vehicle. Accordingly, the user of the system for the delivery of a given parcel is capable of selecting an address for delivery that is in a convenient location to their daily activities. Further a carrier is able to consolidate a number of deliveries within an area around a given parking location providing for an increase in efficiency as the distance between delivery locations is likely significantly reduced.

The location module server includes a memory and communication transceiver configured to receive the position of the electronic communication device when the electronic communication device is at the predetermined location and transmits the location and position of the electronic communication device to a first mobile device. The first mobile device, generally in the possession of a delivery driver who is tasked with delivering the parcel to the vehicle, wherein the delivery driver is provided the location of the vehicle on the first mobile device. The first mobile device having electronic components configured to transmit its location to the server for generally confirming that the driver in possession of the first mobile device is at a position in relative proximity to the electronic communication device. Upon confirmation, the server is configured to execute a command to the electronic communication device for un-securing the vehicle to enable delivery by the driver of the parcel into the unsecured vehicle.

After delivery of the parcel into the vehicle, the driver will utilize the first mobile device to confirm delivery of the parcel into the vehicle to the server. Upon receipt of the confirmation from the first mobile device, the server is configured to communicate the confirmation via the transceiver to a second mobile device. The second mobile device in the possession of the owner or party in control of the vehicle, wherein they are notified that a delivery has occurred within the vehicle.

In another aspect, this disclosure provides a system and method that allows for pickup of parcels from a parking location, wherein the receiver of the parcel is notified when the given parcel is available at the location for pickup and the parcels within the vehicle are organized for efficient delivery.

In another aspect, this disclosure is related to a hardware device adapted for receipt within a vehicle and in communication with the vehicle systems, including, but limited to, door locks, trunk locks, security system, GPS locator, cellular antenna, and other similar vehicle systems, wherein these systems and the hardware device are utilized to determine the location of a vehicle for the delivery of a parcel and allow placement of the parcel into the vehicle.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
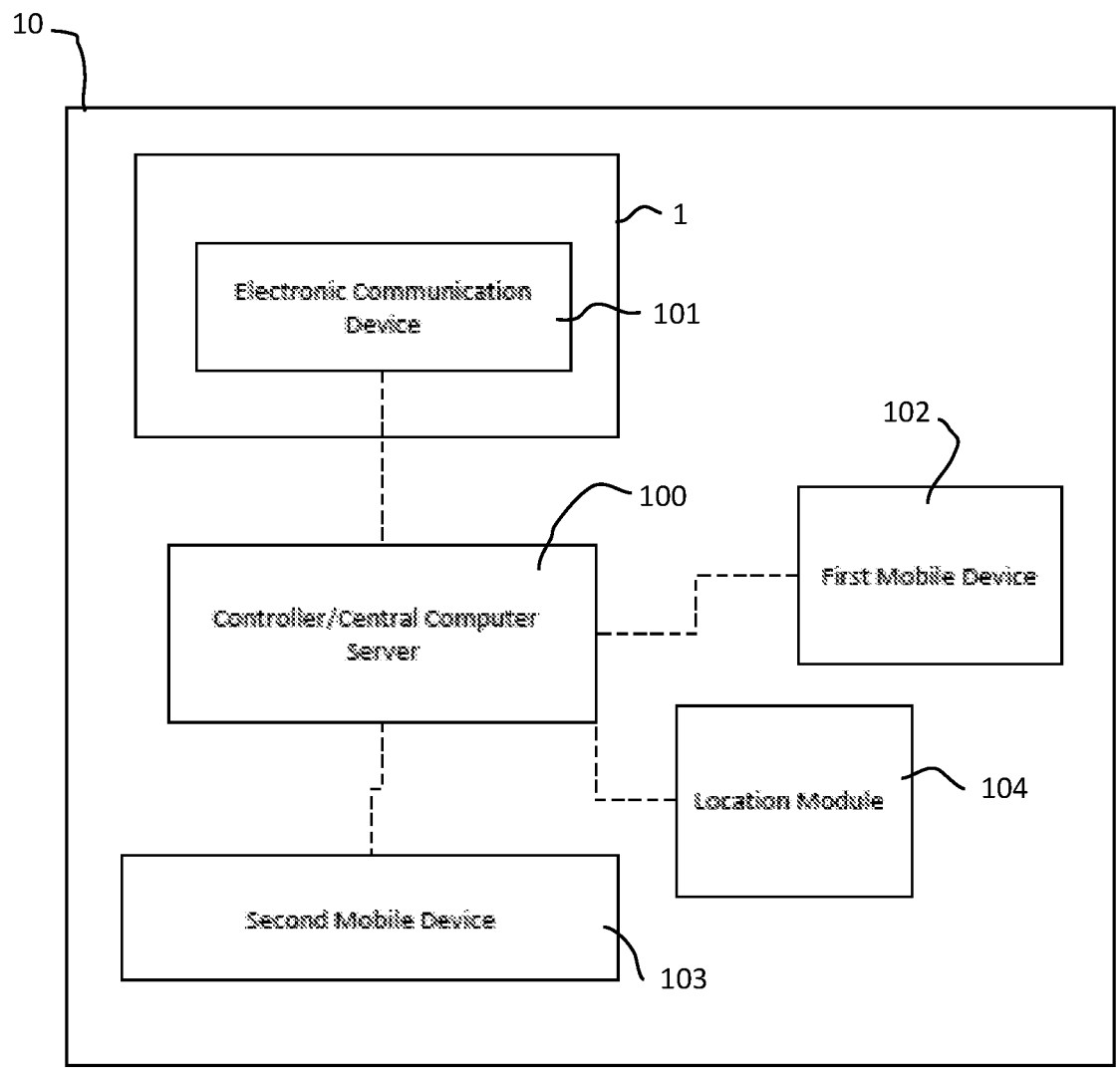
FIG. 1 is a wireframe diagram of the various system and communication pathways of the system and method, according to the present invention.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS., with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Figure 2:
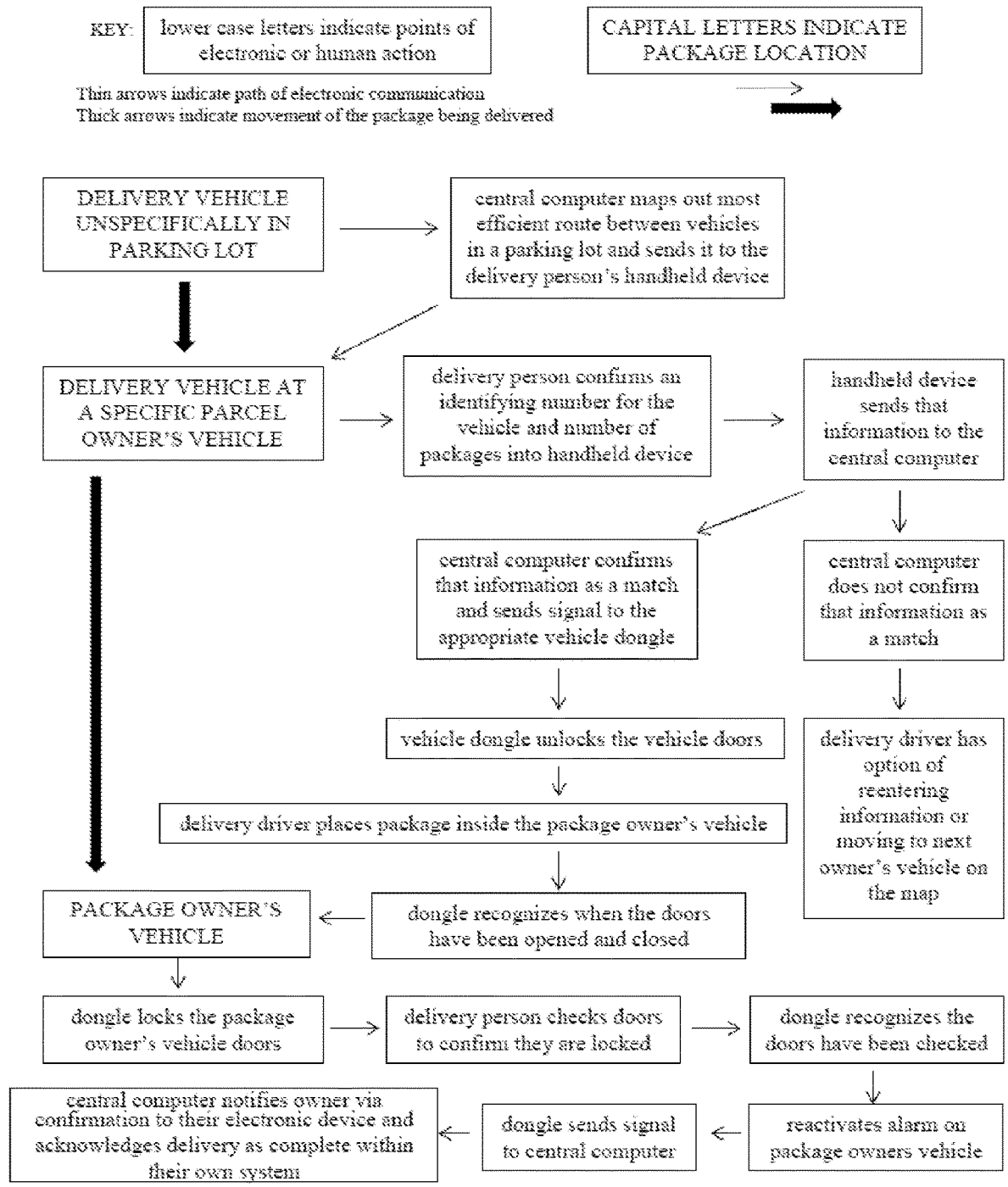
FIG. 2 is a general schematic of the system and method steps, according to the present invention.
Figure 3:
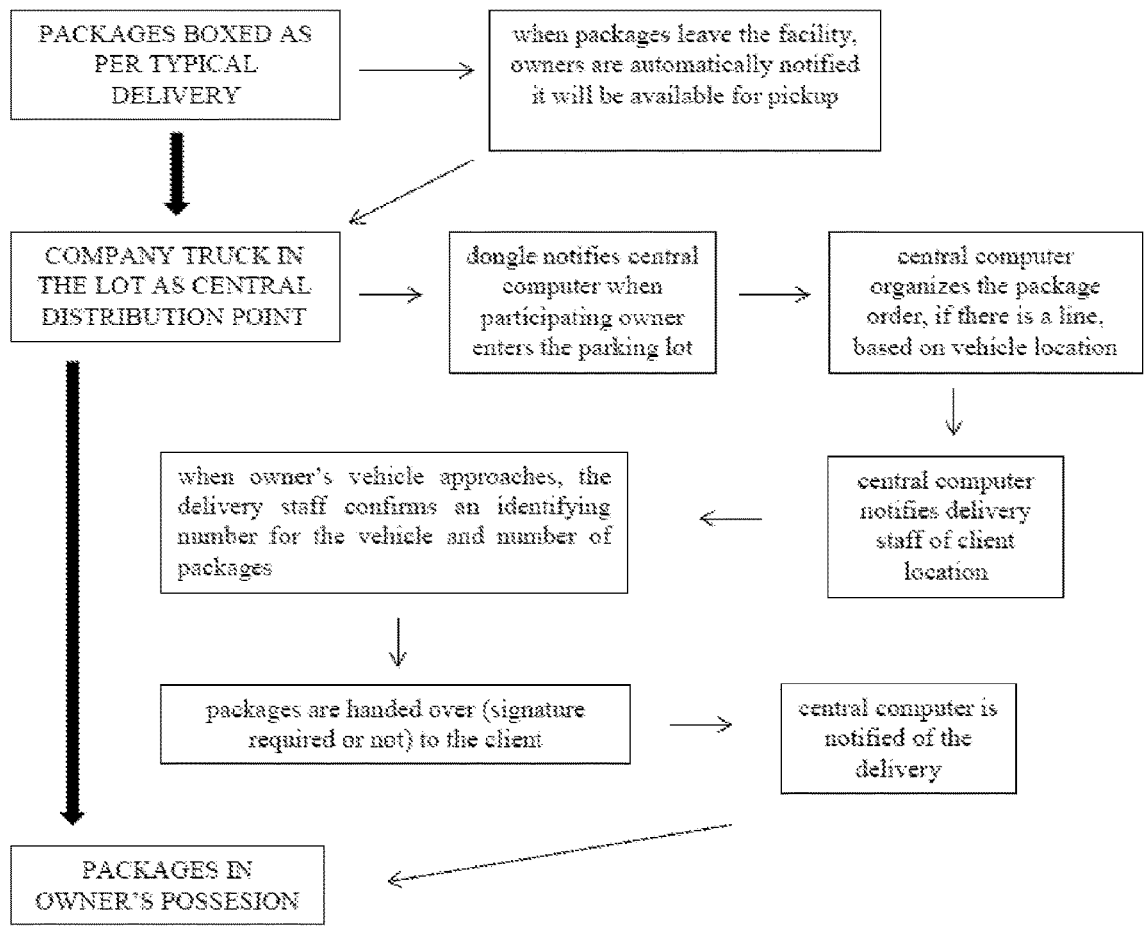
FIG. 3 is a general schematic of an alternate embodiment of the system and method steps, according to the present invention.

Referring now to FIGS. 1-3 of the parcel delivery system and method according to the present disclosure and generally referred to as system 10 and method for system use. The method is most generally configured to utilize various communication, computer, and vehicle systems, to allow for the delivery of a parcel to a vehicle within a predetermined parking location 1, selected by a user of the system 10, and with the vehicle parked at any position or location within this parking location 1. The parking location 1 itself may be, by way of example only, a surface parking lot, a parking garage, or a street parking location.

Accordingly, the system 10 and method for use requires devices adapted for communication with a host computer/ controller 100 generally configured as a server for preforming and directing the steps of the method for use of the system 10. The controller/central computer server 100 is preferably hosted at a data center and adapted for remote communication with the various devices wirelessly via a network. The devices of the system 10 and method include, but are not limited to, an electronic communication device 101 configured for coupling to a vehicle, such as a dongle, a parcel delivery communicative device referred to as a first mobile device 102, such as a handheld unit, and a customer communication device, referred to as a second mobile device 103, such as a smart phone, and other similar communicative devices.

The devices 101, 102, 103 are configured for wireless communication over the network, such as a cellular or Wi-Fi network, and adapted to communicate location, direction, position, status, and various other data to the host computer server 100 as the method steps are attempted and completed.

The electronic communication device 101 is preferably configured as a dongle for removable placement into the vehicle of a user of the system 10. The electronic communication device 101 is generally configured for placement into an on-board diagnostic port, or "OBD II" as it may be referred to, in an electronic coupling with the electronic systems of the vehicle for selective control of these systems during use. The electronic communication device 101 including a global positioning satellite (GPS) receiver, a microprocessor, and a wireless communication transceiver coupled to the GPS receiver and configured to broadcast the GPS position of the electronic communication device 101 in a signal to the controller on the server 100. The electronic communication device 101 configured with a unique user identification number (user ID), wherein the position of an individual electronic device 101 is identified with the user ID.

The electronic communication device 101 received within the vehicle configured to control systems of the vehicle, including, but not limited to, the security system, the door locks, door position, trunk lock, trunk position, alarm, alarm systems, GPS locator, and other similar systems, and to provide data from these various system in the form of a data stream to the server 100.

A location module 104 is hosted on the server 100 and executable by a processor and configured to provide an address of the parking location 1 for the delivery of the parcel to the user and enabling selection of the desired location by the user. The location module 104 generally having a mapping module enabling location detection and configured to find a parking location 1 in proximity to a desired and convenient location of the user for a delivery. The user accessing the location module 104 of the system 10 to select the parking location 1 for delivery and designating the parking location 1 as the predetermined location for delivery of a given parcel to the vehicle in which the electronic communication device 101 is installed.

Accordingly, the system 10 and method allows the user to select the address of the predetermined parking location 1 for use as the delivery address for the receipt of parcels within the vehicle in which the electronic communication device 101 has been installed. Similar to a multiple unit apartment building, the parking location 1 is assigned an address for use by the carrier and each electronic communication device 101 user ID within that location address (similar to an apartment number within an apartment building), but it is not necessary to designate a specific position within the parking location 1 for a delivery. The location module 104 may be accessible through various delivery platforms, such as, but not limited to, a dedicated shopping application hosted on a personal electronic device, a website, a web interface, or provided after a purchase is made and scheduled for delivery.

Accordingly, a parcel delivery operator using the method and system 10 will utilize the position of the electronic communication device 101 to provide the central computer/ controller 100 with the location of the vehicle for delivery. The server 100 will use this position data from the electronic communication device 101 to determine the most efficient route to deliver parcels to a given vehicle at the predetermined location. This route can be mapped in real time or prior to delivery.

To place a given parcel into a vehicle with an installed communication device 101 the delivery carrier will utilize the first mobile device 102. The first mobile device 102 having a display, a microprocessor, and a wireless transceiver configured in the form of a handheld device carried and utilized by the by delivery personal. The transceiver and microprocessor of first mobile device 102 are configured for communication with the controller/central computer server 100 providing data in a data stream to the server 100 and receiving data in a data stream from the server 100 related to the delivery of a given parcel into the vehicle at the predetermined location.

Accordingly, the method provides the first mobile device 102 being configured to receive a signal from the server 100 with the position of the vehicle at the predetermined location for display to the driver. Upon display on the first mobile device 102 the driver will utilize the first mobile device 102 to confirm that they are at the correct vehicle the parcel is to be delivered within. The server 100 configured to receive the position of the first mobile device 102 relative to the position of the electronic communication device 100 and configured to utilize the proximity of the first mobile device 102 and electronic communication device 100 to confirm that the driver is at the proper vehicle for delivery. Alternately, the first mobile device 102 can be configured to transmit additional data to the server 100 related to the identity of the vehicle for delivery to confirm the driver is at the proper vehicle. This additional data can be transmitted to the server 100 through input, scanning, or other similar method, wherein the driver will enter or scan the vehicle details into the first mobile device 102 for confirmation. This identification data may include, but not be limited to, a vehicle license plate number, serial number, VIN, unique identification number assigned by a carrier, or other similar identification means.

After confirmation of the proper vehicle for delivery the server 100 will execute a command to the electronic communication device 101 directing the device 101 to unsecure the vehicle and allow a parcel carrier access to the vehicle interior for placement of the parcel. After delivery, the driver will transmit confirmation of the delivery to the server 100 through the first mobile device 102. After receipt of confirmation the server 100 will transmit confirmation of the delivery to the second mobile device 103 in a signal. The second mobile device 103 is generally in the possession of the owner of the vehicle and the signal generating an alert to confirm delivery to the user. This signal may be in the form of a text message, email, application alert, notification, or other similar communication commonly received on a smart phone or other personal electronic device.

In an alternate embodiment, the system 10 server 100 will use an alternate means in the form of a receipt of an input from the first mobile device 102 to confirm delivery, wherein the server 100 may receive a signal directly from the electronic communication device 101 upon completion of a delivery. Accordingly, the electronic communication device 101 vehicle coupling will be used to detect the opening and closing of the vehicle doors and be utilized to re-secure the vehicle after the delivery is completed.

Upon completion of a given delivery, the controller 100 will utilize communication device 101 information and data to generally recognize the completion and alert a user to this communication by sending a signal to a communication device 103 in the possession and control of the user.

Referring now specifically to FIG. 2, method steps of the systems 10 of the preset disclosure are generally provided in a written flow diagram to provide additional detail to the method steps and processes. Accordingly, a given parcel moves from a delivery vehicle to the interior of a vehicle parked at a predetermined location selected from a convenient parking lot of the user of the system. The central computer/controller and server 100 generally communicates a delivery for receipt within a vehicle to the first mobile device 102 and provides the vehicle identification details. The driver will use the first mobile device 102 to confirm the driver is at the correct vehicle. If the vehicle is not confirmed by the server 100, the driver may attempt to reconfirm or move on to the next delivery.

Upon confirmation of the vehicle, the server 100 will send a signal to the electronic communication device 101 coupled within the vehicle. The electronic communication device 101 will then execute a signal to unsecure the vehicle allowing for placement of the parcel into the vehicle. After completion of the delivery, the electronic communication device 101 will re-secure the vehicle. The driver may then check the doors (this process may be confirmed to the server 100 through the electronic communication device 101). After the vehicle has been re-secured and delivery confirmed, the user is notified at a second mobile device 103. These steps are generally intended to provide additional steps and process that are incorporated into the method of the system 10, but generally not intended to limit the disclosure to these specific steps.

Referring now specifically to FIG. 3, an alternate embodiment for the system 10 and method of delivery for the disclosure is provided. Unlike the primary method, this method generally provides a bulk delivery to the predetermined location (parking lot) and signals to a user at the second mobile device 103 that a parcel is available for pickup at the predetermined location. As the user of the system approaches the location for pickup, the electronic communication device 101 provides a location position to the server 100, wherein the server 100 is notified when the vehicle enters the predetermined location. The position of the vehicle may be utilized to organize parcels and cue them for delivery. Upon arrival at the delivery vehicle, the server 100 may provide identifying information to the first mobile device 102 to ensure the correct parcel is provided to the correct vehicle. The parcel is physically transferred to the vehicle and the server 100 is notified by the carrier, through the first mobile device 102 that delivery has been completed.

Within this alternate embodiment, the carrier may utilize the position of the device 101 at a given position within the parking location 1 to generally and efficiently arrange parcels for efficient delivery if multiple users are in queue within the location 1 to receive parcels.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the appended claims.

What is claimed is:

1. A system for delivering a parcel within a vehicle of a user at a predetermined location, the system comprising:
a location module executable by a processor configured to provide a parcel delivery address to the user corresponding to a parking lot at the predetermined location, the parcel delivery address being any address selected by the user;
an electronic communication device configured with a unique user identification number comprising a GPS receiver, a microprocessor, and a wireless communication transceiver coupled to the GPS receiver, the electronic communication device configured to communicate with and control systems of the vehicle and generate a signal, the electronic communication device configured for removable coupling to the vehicle and coupled to the location module to transmit a position when at the predetermined location;
a first mobile device comprising a display, a microprocessor, and a wireless communication transceiver;
a second mobile device comprising a display, a microprocessor, and a wireless communication transceiver; and
a server comprising a central processing unit, a memory, and a server communication transceiver that receives the position of the electronic communication device at the predetermined location associated with the electronic communication device's unique user identification number, the central processing unit hosting the location module and programmed to:
receive the signal from the electronic communication device when at the predetermined location indicating the electronic communication device's position within the predetermined location based on the unique user identification number;
transmit the position of the vehicle to the first mobile device for visual representation on the display;
confirm a position of the first mobile device and the position of the electronic communication device are within an acceptable proximity;
execute a command to the electronic communication to allow access to the vehicle;
receive a confirmation of the delivery from the first mobile device;
receive a confirmation of vehicle re-security by the electronic communication device; and
transmit the confirmation of the delivery to the second mobile device for visual representation on the display.

2. A system as in claim 1, wherein the server is programmed to receive an input from the first mobile device corresponding to a number of parcels and vehicle identity.

3. A system as in claim 1, wherein the location module includes a mapping module configured to determine the predetermined location of the parking lot based upon an address provided by the user.

4. A method for the delivery of a parcel within a vehicle of a user at a preferred predetermined location comprising:
- selecting by the user an address corresponding to a parking lot location at the preferred predetermined location at a server comprising a central processing unit, a memory, and a server communication transceiver;
- assigning a unique user identification number to an electronic communication device comprising a GPS receiver, a microprocessor, a wireless communication transceiver coupled to the GPS receiver configured to transmit a signal;
- placing the electronic communication device into the vehicle in a communicative coupling with systems of the vehicle;
- transmitting the signal from the electronic communication device to the server when the electronic communication device is at the preferred predetermined location;
- determining the position of the vehicle at the preferred predetermined location at the server;
- calculating the most efficient route for the delivery of the parcel at the vehicle at the server;
- transmitting this route to a first mobile device comprising a display, a microprocessor, and a wireless communication transceiver of a delivery driver of the parcel for display at the server;
- receiving a transmission from the first mobile device to confirm that the first mobile device and electronic communication device are within an acceptable proximity at the server;
- transmitting a command to the electronic communication device to provide access to the vehicle for delivery of the parcel at the server;
- delivering the parcel into an interior of the vehicle;
- transmitting a confirmation of delivery from the first mobile device for receipt at the server;
- transmitting a signal to re-secure the vehicle after receiving confirmation of delivery; and
- transmitting the confirmation of delivery to a second mobile device comprising a display, a microprocessor, and a wireless communication transceiver of the user for display at the server.

5. A method as in claim 4, wherein the number of parcels being delivered is transmitted to the first mobile device.

6. A method as in claim 4, wherein the selecting of an address by a user includes a map configured to aid the user in determining the preferred predetermined location based upon the address provided by the user.

7. A method for the delivery of a parcel of a user at a predetermined location, the predetermined location being a parking lot, the method comprising:
- selecting by the user the parking lot at the predetermined location with a corresponding address at a server comprising a central processing unit, a memory, and a server communication transceiver;
- assigning a unique user identification number to an electronic communication device comprising a GPS receiver, a microprocessor, a wireless communication transceiver coupled to the GPS receiver configured to transmit a signal;
- placing the electronic communication device into a vehicle in a communicative coupling with systems of the vehicle;
- transmitting from a first mobile device comprising a display, a microprocessor, and a wireless communication transceiver of a delivery driver of the parcel the position of the parcel at the predetermined location at the server;
- transmitting the position of the parcel at the predetermined location to a second mobile device comprising a display, a microprocessor, and a wireless communication transceiver of the user for display at the server;
- driving the vehicle to the predetermined location by the user;
- transmitting from the electronic communication device the position of the vehicle associated with the unique user identification number at the predetermined location at the server;
- transmitting to the first mobile device the presence of the vehicle at the predetermined location at the server;
- preparing the parcel for delivery; and
- delivering the parcel to the user.

8. A method as in claim 7, wherein the electronic communication device is placed within an vehicle on-board diagnostic port.

9. A method as in claim 7, wherein the number of parcels being delivered is transmitted to the first mobile device.

10. A method as in claim 7, wherein the selecting of an address by a user includes a map configured to aid the user in determining the predetermined location based upon the address provided by the user.

* * * * *